June 23, 1964  E. HUGHES  3,138,399
GRAIN TRUCK COVER
Filed June 18, 1962  5 Sheets-Sheet 1

INVENTOR.
Ed Hughes
BY Wells & St. John
ATTYS.

June 23, 1964     E. HUGHES     3,138,399
GRAIN TRUCK COVER

Filed June 18, 1962     5 Sheets-Sheet 3

INVENTOR.
Ed Hughes
BY
ATTYS.

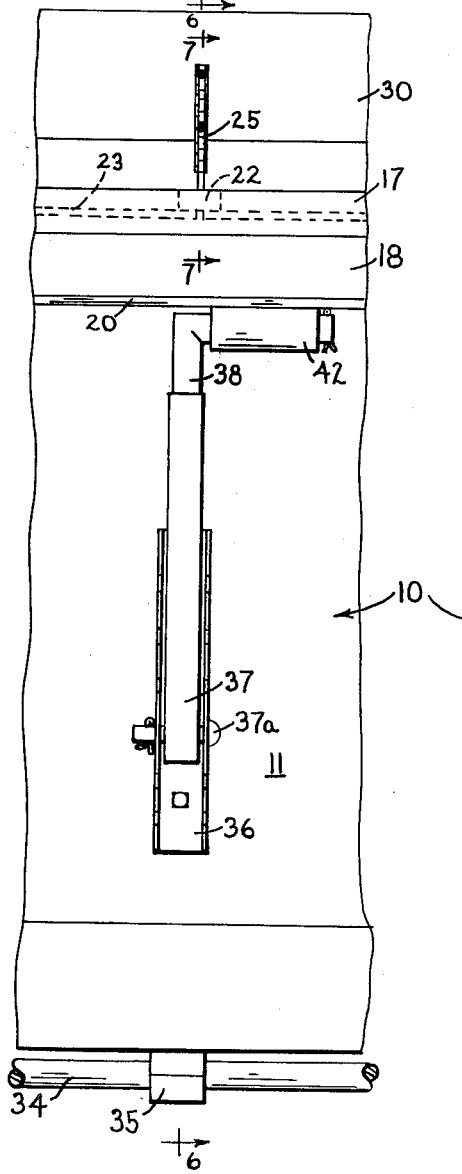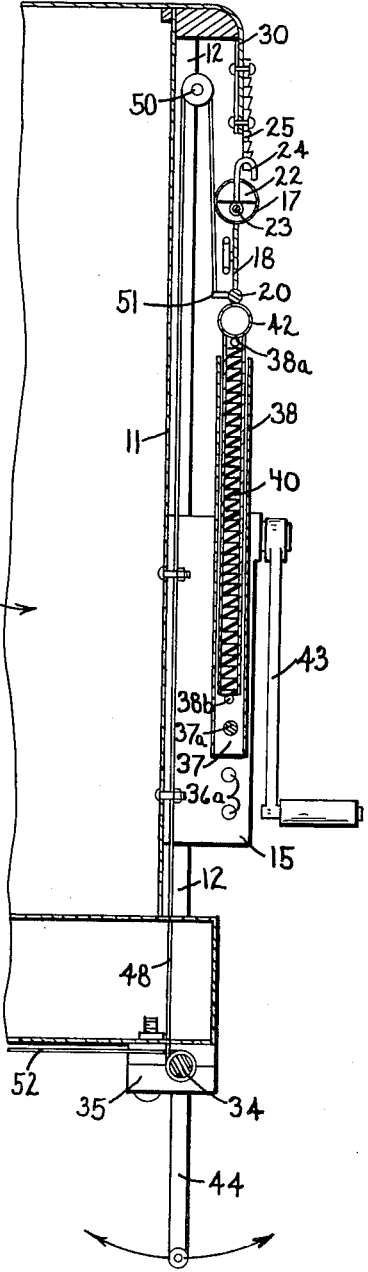

June 23, 1964 E. HUGHES 3,138,399
GRAIN TRUCK COVER
Filed June 18, 1962 5 Sheets-Sheet 5

INVENTOR.
Ed Hughes
BY
ATTYS.

United States Patent Office 3,138,399
Patented June 23, 1964

3,138,399
GRAIN TRUCK COVER
Ed Hughes, Box 167, Garden City, Kans.
Filed June 18, 1962, Ser. No. 203,097
5 Claims. (Cl. 296—100)

This application relates to a novel cover for a grain truck.

The present invention is concerned with a tarpaulin cover designed specifically for a grain truck. It is a common practice to transport bulk grain in large rectangular truck beds and to secure a canvas tarpaulin cover over the loaded bed so as to secure the grain during highway travel and protect the grain from foreign substances. In normal practice today this cover is secured manually, requiring the assistance of one or two additional men in addition to the truck driver. The cover is normally quite loose and is subject to additional stress due to the air velocity and pressure built up during highway travel.

It is a first object of this invention to provide a movable canvas cover for a grain truck which may be operated by one man from a single position. The placement of the cover can be accomplished very quickly with a minimum of manual effort and requires no assistance from a second party.

Another object of this invention is to provide a novel tarpaulin cover wherein a constant tension is applied to the closed cover in both a longitudinal and transverse direction. The cover is thus secured across the top of the loaded truck bed and will not be flapping due to subsequent wind pressures.

Another object of this invention is to provide such a cover mechanism which is simple in construction and which can be operated without skill or special training. The basic elements of the cover utilize mechanical devices which can be readily understood by anyone in this field.

The final object of this invention is to provide such a cover which may be applied to any conventional grain truck bed without essential modification of the bed structure.

These and further objects will be evident from a study of the following description taken in conjunction with the accompanying drawings which illustrate a preferred form of the invention. It is to be understood that this form is merely exemplary and that it is not intended to limit or restrict the scope of the invention except as my invention is defined in the claims which follow:

In the drawings:

FIGURE 5 is a fragmentary side view showing one of the tension spring assemblies;

FIGURE 6 is a ssectional view taken along line 6—6 of FIGURE 5;

Figure 1:
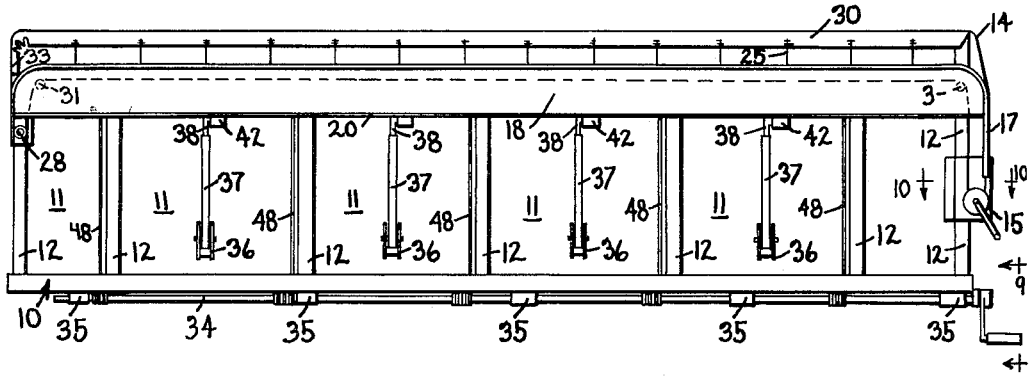
FIGURE 1 is a side view of the truck bed equipped with the present invention and viewed from the side opposite the driver.
Figure 2:
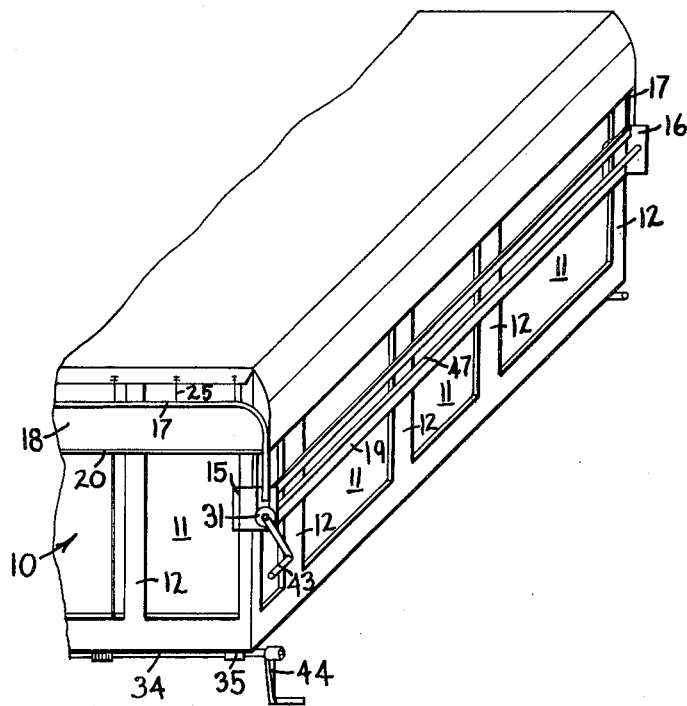
FIGURE 2 is a perspective view showing the front end of the truck bed illustrated in FIGURE 1.
Figure 3:
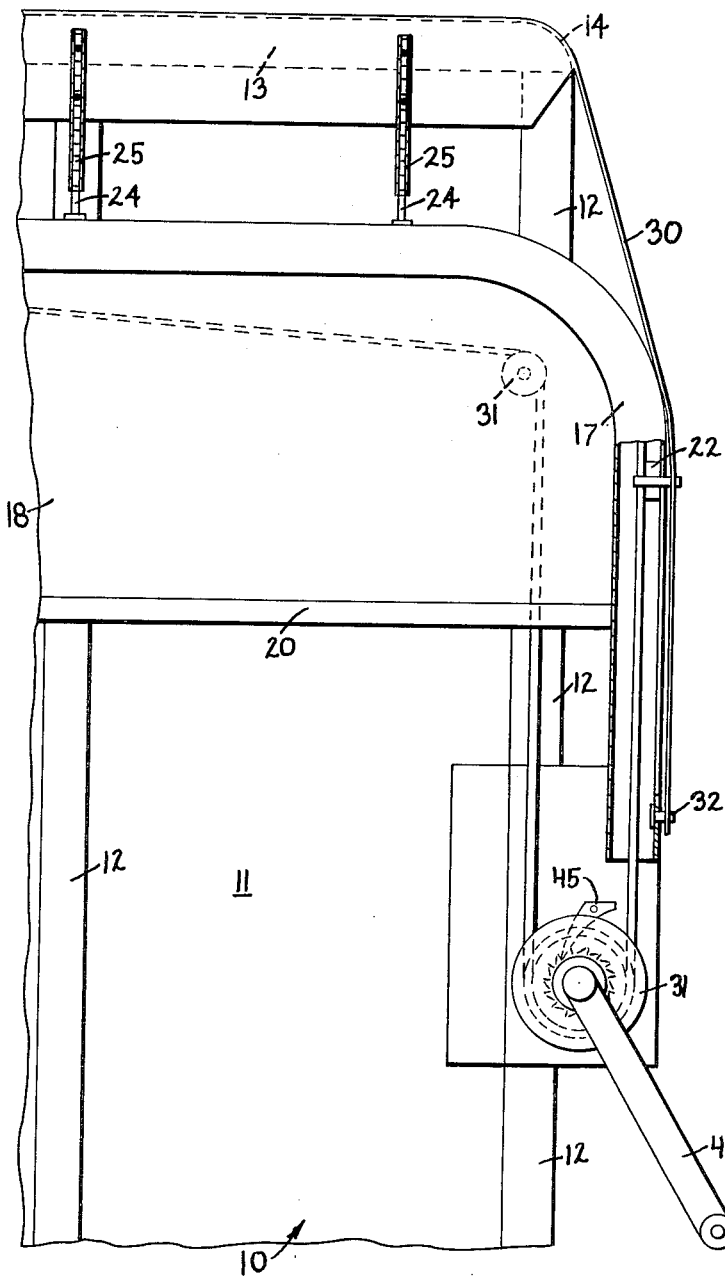
FIGURE 3 is an enlarged side view of the front end of the truck bed showing the cover in its extended position.

Referring now to the drawings, FIGURE 1 illustrates a side view of a truck bed such as those commonly used in the transportation of bulk grain. The bed is illustrated without showing the supporting wheel structure, nor the cab or tractor used to pull the bed along the highway. Such elements are conventional and have no limiting relationship to this invention. The bed, generally designated as 10, includes side panels 11 having vertical ribs 12. The front end of the bed 10, which is shown in FIGURE 2, includes the same type of panels and ribs 11 and 12. Along the top edge of the bed sides are a pair of top rails 13, having a curved front edge 14 which bends with the front rib 12. This structure can best be seen in FIGURES 3 and 4.

At the front and rear of the bed 10 and at each side thereof, are brackets 15 and 16 which slide vertically along the front and rear ribs 12 respectively. The two pairs of brackets 15, 16 are respectively joined by transverse braces 19. The brackets 15 and 16 have fixed thereto a bent guide tube 17 which extends along the entire length of the bed 10. The tube 17 is provided with a depending vertical plate 18 having a rod 20 fixed to the plate 18 along its lowermost edge. Thus the entire structure 15, 16, 17, 18 and 20 is an integral sliding unit mounted for vertical motion relative to the bed 10.

Figure 7:
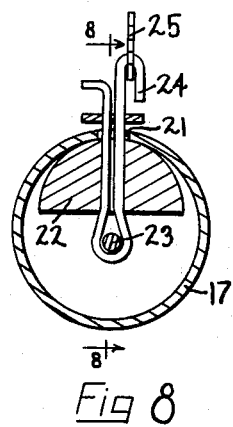
FIGURE 7 is an enlarged sectional view through the guide tube as seen in line 7—7 in FIGURE 5.

The sliding assembly previously described constitutes the longitudinal supporting framework or track for the canvas cover 30. The cover 30, which is to be opened longitudinally for filling of the bed 10, is mounted on this assembly by means of a plurality of slides 22 which are positioned within the guide tube 17. The tube 17 is provided with a longitudinal slot 21 along its outer surface. The slot 21 extends along the entire length of the tube 17. This particular structure can best be seen in FIGURE 7. The slides 22 slidably receive a cable 23 which also is mounted within the tube 17. It is essential to note that one exception exists to this sliding relationship between the slides 22 and cable 23. The rearmost slide 22 is fixed to the cable 23. The reason for this will be evident from the following description.

In order to connect the slides 22 to the cover 30 a cotter pin 24 is provided and extends from each slide 22 outwardly through the slot 21. A chain 25 is connected between the cotter pin 24 and a suitable grommet or rivet on the cover 30. This chain structure can best be seen in FIGURE 3. The chain 25 merely acts as a connection between the movable slides 22 and the large cover 30. The front end of the tarp 30 is anchored directly to the tube 17 by means of a suitable connection illustrated at 32. The cable 23 is engaged by a front pulley 31 rotatably mounted by the front brackets 15. Cable 23 extends over a pair of idler pulleys 31 which are mounted on the back side of the plate 18 and a rear pulley 28 rotatably journalled by the sliding brackets 16. This structure is identical on each side of the bed 10.

Figure 4:
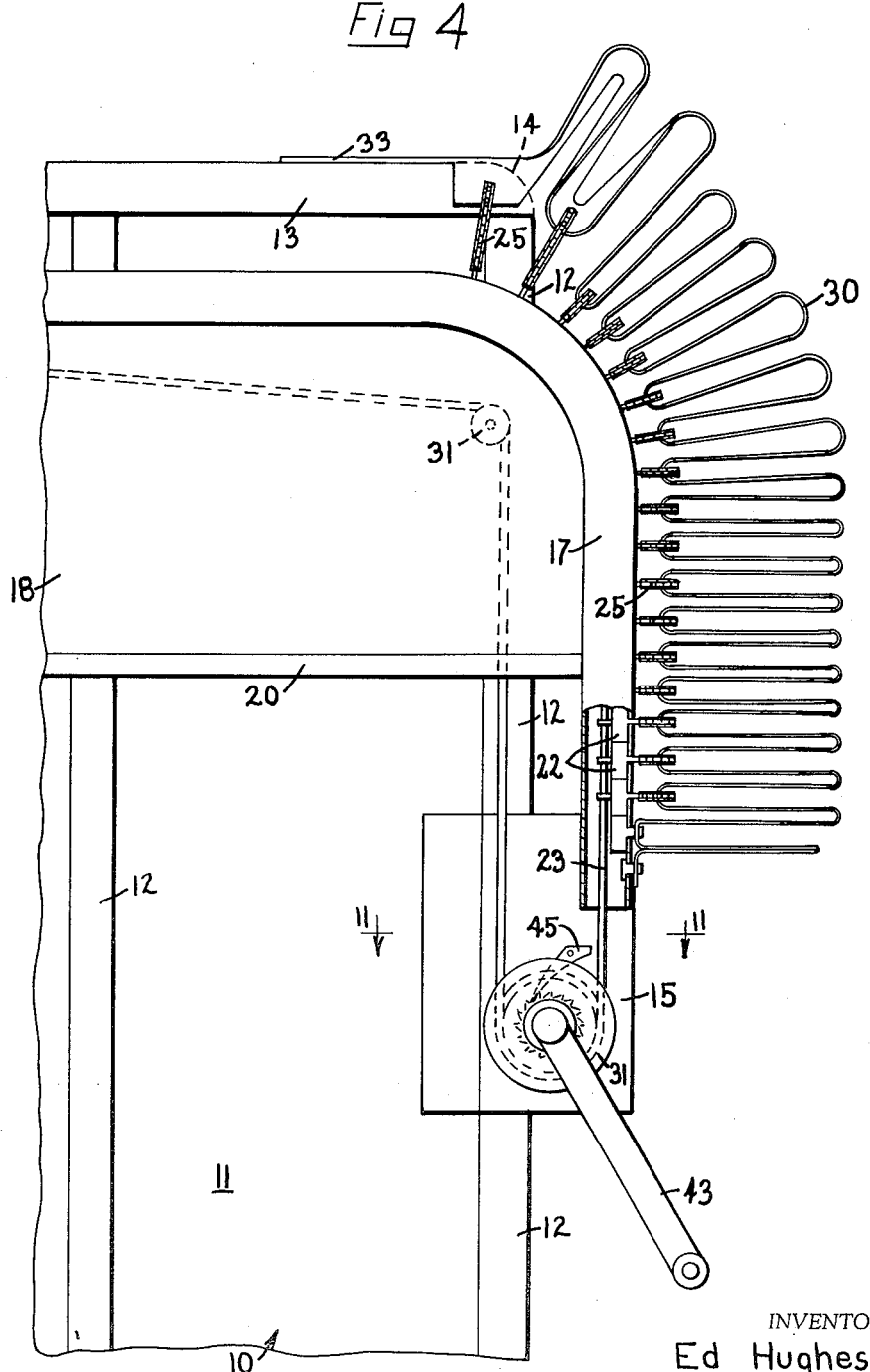
FIGURE 4 is a view similar to FIGURE 3 showing the cover in its fully retracted position.

The movement of the cover or tarpaulin from the rear of the bed 10 to the front, as shown in FIGURE 4, is accomplished by rotation of a handle 43 on the supporting shaft 47 connecting the two front pulleys 31. The pulleys 31 are provided with a ratchet assembly 45 which prevents forward movement of the cover 30 when in its extended position. The ratchet assembly 45 can be manually released and by turning the handle 43, one can pull the entire cover 30 to the front of the bed as seen in FIGURE 4. This is accomplished by the fact that the rearmost slide 22 is fixed to the cable 23 and therefore will pull all the succeeding slides 22 along the tube 17 until the entire cover has been gathered as seen in FIGURE 4. Conversely, to close the cover 30 one must merely rotate the handle 43 in the reverse direction and the rearmost slide 22 at each side of the assembly will pull the remaining slides through the tension on the cover 30. The smooth curved front edges 14 of the top rails 13 will prevent the cover 30 from being snagged during this pulling operation. The cover 30 is provided with a rear flap 33 which may be secured to the bed 10 in any suitable manner after the cover 30 has been fully extended.

Since the extension of cover 30 necessarily involves rather free movement of the cover relative to the bed 10, it has been found necessary to provide a mechanism whereby the cover 30 may be stretched tautly across the bed 10. This is accomplished by raising or lowering the guide tube 17. The mechanism by which this movement is effected can best be seen in FIGURES 5 and 6. Spaced along the length of the bed 10 are a plurality of vertical brackets 36 which are secured to the panels 11. Each bracket 36 is an outwardly facing channel having a plurality of apertures 36a formed therein. Mounted within the brackets 36 are individual tubes 37 which are anchored by means of pins 37a which fit through the apertures 36a. A concentric inner tube 38 is slidably mounted within each fixed tube 37. The inner tube 37 is bent at a right angle at its top end and is received within a horizontal section of tubing designated at 42. The tubing 42 is secured to the lower edge of the rod 20 on plate 18. Thus vertical movement of the inner tube 38 relative to the fixed tube 37 will raise or lower the rod 20, plate 18 and guide tube 17.

Depending downwardly from the tube 38 is a tension spring 40 which is anchored at its upper end by a pin 38a and at its lower end by a pin 38b. The pin 38a is fixed to the inner tube 38 while the pin 38b is secured to the fixed tube 37. Therefore the spring 40 tends to contract the inner tube 38 within the fixed tube 37. This contraction of spring 40 will normally cause the cover 30 to be stretched across the top of the bed 10.

Figure 9:
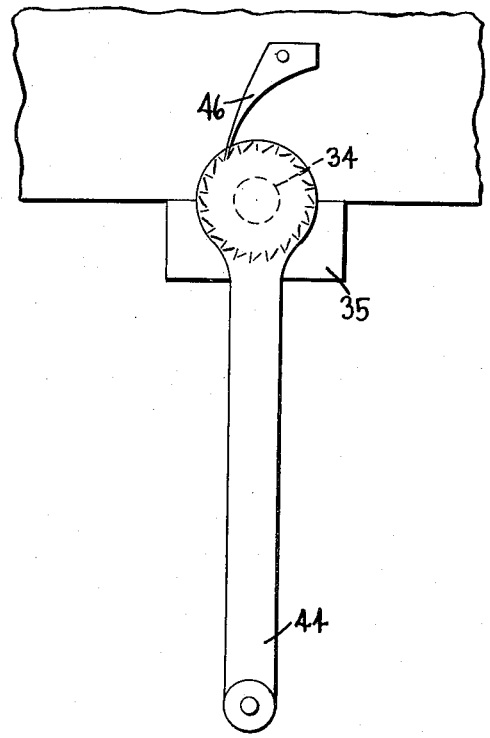
FIGURE 9 is an enlarged end view of the lower ratchet assembly as seen along line 9—9 in FIGURE 1.
Figure 8:
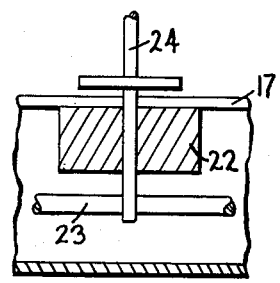
FIGURE 8 is an enlarged sectional view through the guide tube as seen in line 8—8 in FIGURE 6.
Figure 10:
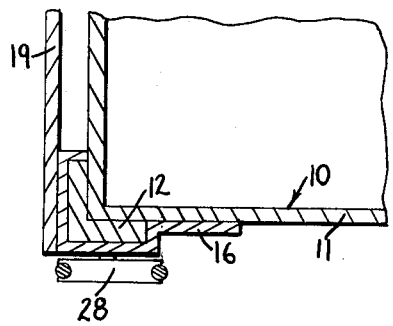
FIGURE 10 is an enlarged sectional view taken along line 10—10 in FIGURE 1, illustrating the bracket for the forward pulley of the retracting mechanism.
Figure 11:
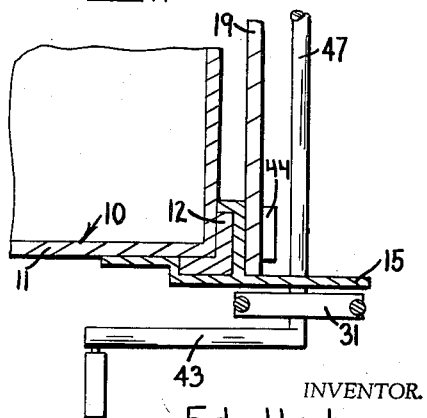
FIGURE 11 is a view similar to FIGURE 10, taken through the bracket mounting the rear idler pulley assembly of the retracting assembly.

In order to release this stretching action of spring 40 so that the cover 30 may be extended or retracted from the bed 10, it is necessary to provide a second operating mechanism which can best be seen in FIGURES 1, 5 and 6. This mechanism includes a longitudinal shaft 34 monuted at each side of the bed 10 and extending along the entire length thereof. Each shaft 34 is rotatably journalled by means of spaced bearing supports 35 mounted on the bed 10. The right hand shaft 34 on bed 10 is provided with a removable ratchet handle 44 and a ratchet assembly 46 which is shown on a large scale in FIGURE 9. The purpose of the ratchet assembly 46 is to counteract the action of spring 40 when the plate 18 and guide tube 17 are in the raised position. The shaft 34 is provided with a first set of cables 48 which extend vertically along the outer surfaces of panels 11 over pulleys 50 and downwardly to a connection at 51 with the rod 20. The cables 48 can therefore be wound or unwound on the shafts 34 to raise or lower the tube 17 relative to the bed 10 in opposition to the spring 40. The shafts 34 are connected by transverse cables 52 which cause each shaft 34 to be operated simultaneously from the single handle 44 at the front of the bed 10.

The operation of this cover is extremely simple and should be evident from the disclosure previously offered. The cover 30 will normally be carried at the front of the bed 10, as shown in FIGURE 4, except when the bed 10 is loaded fully with grain. Should it be advisable to travel with the cover 30 extended, a central rail or rib (not shown) could be added along the bed 10 to provide the necessary central support. When the bed 10 is loaded with grain, one merely turns the handle 43 to spread the cover 30 along the longitudinal length of the bed 10. The handle 44 is then operated to lower the guide tubes 17 along each side of the bed 10 due to the action of springs 40. The springs 40 will supply the necessary lateral tension on the cover 30 so as to maintain it in a taut position. When the bed 10 is to be unloaded, one must merely reverse this procedure, first operating the handle 44 to raise the guide tubes 17 along both sides of the bed 10, and secondly, operating the handle 43 to retract the cover 30 along the longitudinal length of the bed 10. The entire operation can be handled by a single man at one position along the truck. No precise adjustment or special tools are required for operation of the cover 30 at the job site.

The structure illustrated in the drawings is illustrative of my invention but is not intended to be restrictive of the many forms which this invention might take in actual practice. For this reason it is not intended that this example be taken to limit or restrict the scope of the invention except as it is set out in the claims which follows.

Having thus described my invention, I claim:

1. A canvas cover assembly for a truck body having vertically extending side and end panels, comprising:
   a pair of longitudinal vertically-oriented plates mounted respectively at each side of the truck body for sliding vertical movement relative to the side panels thereof;
   yieldable means operatively connected to the truck body and to said plates adapted to urge said plates in a downward direction relative to the truck body;
   means mounted on the truck body operatively connected to said plates adapted to selectively move said plates upwardly relative to the truck body in opposition to the yieldable means;
   longitudinal channel means fixed to said plates and extending along the length thereof;
   connecting means mounted within said channel means for movement along the length thereof;
   pulley means mounted on each plate operatively connected to said connecting means adapted to selectively effect longitudinal motion of said connecting means relative to the channel means;
   and a canvas cover supported by the top edges of the truck body panels, the side edges of said cover being secured to said connecting means along the adjacent plates.

2. A cover assembly as defined in claim 1 wherein said yieldable means comprises a plurality of tubular members mounted on the truck body in vertical positions, a plurality of smaller diameter tubular members depending from said plates in coaxial sliding relationship with the first named individual tubular members, and tension springs mounted within the smaller tubular members and connected at the ends thereof to the sliding pair of members.

3. A cover assembly as defined in claim 1 wherein said yieldable means comprises a plurality of vertical tension spring assemblies spaced longitudinally along the length of the truck body;
   said means to move the plates in opposition to the yieldable means comprising a pair of longitudinal shafts rotatably mounted along the two respective sides of the truck bed below said plates, a plurality of cables extending upwardly from the shafts, over individual pulleys mounted on the plates and having their outer ends fixed to the respective plates, and means connecting the shafts adapted to effect simultaneous winding of the cables thereon.

4. A cover assembly for a truck body having upright side and end panels comprising:
   a pair of guide members extending longitudinally alongside the side panels;
   a flexible cover draped over the top of said truck body and overlapping the tops of said panels;
   flexible means mounted by said guid members and guided thereby for movement along the length thereof;
   slide means attached to the side edges of said cover slidably engaged with said members and operably connected to said flexible means to move the cover lengthwise over the body upon movement of said flexible means lengthwise of the guide members;

yielding means connected between said guide members and the truck body urging the guide members downward to keep the cover stretched transversely over the body;

manually operable means on the body operably connected to said guide members to move them upward in opposition to the yielding means; and means on the body connected to said flexible means operable to move the flexible means lengthwise of the guide members.

5. A cover assembly as defined in claim 4 wherein said guide members and said flexible means have end portions at one end of said truck body extending downwardly at the side edges of the end panel to which the cover is attached, the slide means being movable by said flexible means to the downwardly extending end portions of the guide members to gather the cover at said end of the body.

References Cited in the file of this patent

UNITED STATES PATENTS

| | | |
|---|---|---|
| 2,510,307 | Daniels | June 6, 1950 |
| 2,757,042 | Schultz | July 31, 1956 |